UNITED STATES PATENT OFFICE.

HARRY P. BASSETT, OF CATONSVILLE, MARYLAND, ASSIGNOR TO THE SPAR CHEMICAL COMPANY, OF BALTIMORE, MARYLAND, A CORPORATION OF MARYLAND.

SEPARATION OF SODIUM AND POTASSIUM SALTS.

1,194,465.

Specification of Letters Patent.

Patented Aug. 15, 1916.

No Drawing.

Application filed March 8, 1915. Serial No. 12,934.

*To all whom it may concern:*

Be it known that I, HARRY P. BASSETT, a citizen of the United States, residing at Catonsville, in the county of Baltimore and State of Maryland, have invented certain new and useful Improvements in Separation of Sodium and Potassium Salts, of which the following is a specification.

This invention relates to the separation of sodium and potassium salts and has particular reference to certain improvements in my separation process described and claimed in Letters Patent No. 1,091,033, granted March 24, 1914.

My improved process will be readily understood from the following example illustrating its application to the separation of a solution containing sodium and potassium sulfates, in the proportion of 90 parts by weight of sodium sulfate and 10 parts by weight of potassium sulfate. To this solution I add sodium chlorid in approximately molecular proportions with respect to the potassium sulfate present. The resulting solution is evaporated by being heated in a suitable open vessel until sufficient sodium sulfate has been crystallized out and separated so that the potassium salt (potassium chlorid) in solution constitutes approximately forty per cent. by weight of the salts present in the mother liquor. To this solution I now add sodium nitrate in approximately molecular proportions with respect to the potassium chlorid in solution. The resulting solution is then evaporated as before until sufficient crystals of sodium chlorid and sodium sulfate are crystallized out of the hot solution and removed so that the potassium salt in solution (potassium nitrate) constitutes from 65 to 70 per cent. by weight of the salts in solution. The crystallized sodium chlorid and sodium sulfate removed is used in place of sodium chlorid in the treatment of a new batch of sodium sulfate and potassium sulfate to be separated, the sodium sulfate serving no purpose in the process but being for the most part, eliminated in the next crystallizing operation, the part not crystallized out and removed being later returned with sodium chlorid in the treatment of a third batch of solution of sodium and potassium sulfates to be separated. The solution containing potassium nitrate in the proportions of approximately from 65 to 70 per cent. by weight of the salts present is then allowed to cool and the potassium nitrate is precipitated and withdrawn until only 15 per cent. of the salts present in the solution consists of potassium nitrate, the remaining salts being sodium chlorid and sodium nitrate. The removed potassium nitrate crystals are then dissolved in water and there is added to such solution an amount of the original solution containing the sodium and potassium sulfates to provide approximately molecular proportions of sodium sulfates with respect to the potassium nitrate present. This solution is in turn evaporated and the crystals of potassium sulfate which form are separated therefrom. These crystals are freed from sodium nitrate by washing in hot water and are ready for use or to be placed on the market.

The solution above referred to containing sodium chlorid, sodium nitrate and potassium nitrate, the latter in the proportion of 15 per cent. by weight of the salts present as well as the final solution resulting from the washing of the potassium sulfate crystals and consisting principally of sodium nitrate, are added to the solution above referred to containing potassium chlorid in an amount substantially equal to forty per cent. of the salts present instead of adding sodium nitrate as above.

It will thus be seen that the reagents employed in separating the sodium and potassium sulfates are used over and over again, the only separated materials which are not used, are the crystals of sodium sulfate which result from the first evaporation and crystallization and the potassium sulfate which results from the last evaporation and crystallization, both of these salts as obtained are ready for use or sale, but they may be further purified if desired, or transferred into other sodium and potassium salts.

While I have described in the illustrative example of my invention the preferred details of procedure and proportions of reagents, it is to be understood that the details of procedure and proportions of reagents may be widely varied and that known chemical equivalents of the reagents may be employed, all without departure from the spirit of my invention or the subjoined claims.

Having described my invention, I claim:—

1. In the process of separating sodium and potassium sulfates, the steps which consist in adding sodium chlorid to a solution of said salts, crystallizing a proportion of the salts in solution, separating the crystals formed from the mother liquor, adding sodium nitrate to such liquor, crystallizing a portion of the salts in solution and removing the crystals formed.

2. In the process of separating sodium and potassium sulfates, the steps which consist in adding sodium chlorid to a solution of said salts, crystallizing a proportion of the salts in solution, separating the crystals formed from the mother liquor, adding sodium nitrate to such liquor, crystallizing a portion of the salts in solution at an elevated temperature, removing the crystals formed, cooling the solution, and separating the precipitate formed.

3. In the process of separating sodium and potassium sulfates, the steps which consist in adding sodium chlorid to a solution of said salts, crystallizing a proportion of the salts in solution, separating the crystals formed from the mother liquor, adding sodium nitrate to such liquor, crystallizing a portion of the salts in solution at an elevated temperature, removing the crystals formed, cooling the solution, separating the precipitate formed, redissolving such crystals in water and adding sodium sulfate to the solution.

4. In the process of separating sodium and potassium sulfates, the steps which consist in adding sodium chlorid to a solution of said salts, crystallizing a proportion of the salts in solution, separating the crystals formed from the mother liquor, adding sodium nitrate to such liquor, crystallizing a portion of the salts in solution at an elevated temperature, removing the crystals formed, cooling the solution, separating the precipitate formed, redissolving such crystals in water, adding sodium sulfate to the solution, crystallizing a portion of the salts in solution and separating the crystals formed.

5. In the process of separating sodium and potassium sulfates, the steps which consist in adding sodium chlorid to a solution of said salts, crystallizing a proportion of the salts in solution, separating the crystals from the mother liquor, adding sodium nitrate to such liquor, crystallizing a portion of the salts in solution at an elevated temperature, removing the crystals formed, cooling the solution, separating the precipitate formed, redissolving the crystals in water, adding sodium sulfate to the solution, crystallizing a portion of the salts in solution, separating the crystals formed and washing such crystals with hot water.

In testimony whereof I affix my signature in presence of two witnesses.

HARRY P. BASSETT.

Witnesses:
Ph. H. Hoffman,
C. H. Slater.